United States Patent
DeCote

(10) Patent No.: US 11,763,001 B1
(45) Date of Patent: Sep. 19, 2023

(54) ANTI-MALWARE COMPUTER CONFIGURATION

(71) Applicant: Robert DeCote, Hollywood, FL (US)

(72) Inventor: Robert DeCote, Hollywood, FL (US)

( * ) Notice: Subject to any disclaimer, the term of this patent is extended or adjusted under 35 U.S.C. 154(b) by 0 days.

(21) Appl. No.: 18/093,228

(22) Filed: Jan. 4, 2023

Related U.S. Application Data

(60) Provisional application No. 63/296,638, filed on Jan. 5, 2022.

(51) Int. Cl.
G06F 21/56 (2013.01)
G06F 21/54 (2013.01)
G06F 21/55 (2013.01)

(52) U.S. Cl.
CPC ............ G06F 21/568 (2013.01); G06F 21/54 (2013.01); G06F 21/554 (2013.01)

(58) Field of Classification Search
CPC ....... G06F 21/568; G06F 21/54; G06F 21/554
See application file for complete search history.

(56) References Cited

U.S. PATENT DOCUMENTS 7,290,288 B2 * 10/2007 Gregg .................... H04L 63/08 726/28
10,075,459 B1 * 9/2018 Suryanarayanan ......................... H04L 63/1441
2006/0187035 A1 * 8/2006 Adams .................... G08B 21/18 340/691.1
2007/0180122 A1 * 8/2007 Barrett .................... H04L 67/14 709/227
2009/0328186 A1 * 12/2009 Pollutro ................ G06F 21/335 726/13
2023/0058494 A1 * 2/2023 Shaw ....................... H03K 5/24

FOREIGN PATENT DOCUMENTS

WO WO 2016/049324 A1 * 3/2016 ........... G06F 15/173
WO WO 2017/121459 A1 * 7/2017 ............. H04L 29/08
WO WO 2018/233554 A1 * 12/2018 ............ H04W 76/00

* cited by examiner

*Primary Examiner* — Christopher A Revak
(74) *Attorney, Agent, or Firm* — John Rizvi; John Rizvi, P.A.—The Patent Professor©

(57) ABSTRACT

An anti-malware computer providing a hardware-centric solution for preventing (or substantially reducing) hacking which cannot be affected by contaminated software. The anti-malware computer is configured with an anti-malware circuit device, Internet regulator devices and an Internet active indicator that facilitate receiving an Internet access request from an Internet regulator device. Responsive to the Internet access request received, establishing an Internet communications link between the anti-malware computer and the Internet and illuminating an Internet active indicator. Monitoring for active Internet activity cessation from the anti-malware computer and if inactive initiating an Internet inactivity timer and counting the total Internet inactivity time. If an Internet inactivity level has been met blocking the Internet communications link between the anti-malware computer and the Internet and deactivating the Internet ready indicator.

19 Claims, 6 Drawing Sheets

ANTI-MALWARE COMPUTER CONFIGURATION

CROSS-REFERENCE TO RELATED APPLICATION

This application claims the benefit of U.S. Provisional Patent Application No. 63/296,638, filed Jan. 5, 2022, which is hereby incorporated by reference herein in its entirety.

FIELD OF THE INVENTION

The present invention relates generally to computer security, and more particularly, to a computing device and method for preventing unauthorized computer access and hacking.

BACKGROUND OF THE INVENTION

As increasing numbers of computers and other computing devices are interconnected through various networks, such as the Internet, such that computer security has become increasingly more important, particularly from invasions or attacks delivered over a network or over an information stream. Detection of viruses and malware has been a concern throughout the era of the personal computer. With the growth of communication networks such as the Internet and increasing interchange of data, including the rapid growth in the use of e-mail for communications, search engines and streaming, the infection of computers through communications or file exchanges is an increasingly significant consideration. Infections take various forms but are typically related to computer viruses, Trojan programs or other forms of malicious code (i.e., malware). These attacks come in many different forms, including, but certainly not limited to, computer viruses, computer worms, system component replacements, denial of service attacks, even misuse/abuse of legitimate computer system features all of which exploit one or more computer system vulnerabilities for illegitimate purposes.

Malware may become resident on a computer using a number of techniques. For example, a computer connected to the Internet may be attacked so that a vulnerability on the computer is exploited and the malware is delivered over the network as an information stream. By way of another example, malware may become resident on a computer using social engineering techniques. For example, a user may access a resource such as a Web site and download a program from the Web site to a local computer. While the program may be described on the Web site as providing a service desirable to the user; in actuality, the program may perform actions that are malicious. When a computing device is attacked or "infected" by computer malware, the adverse results are varied, including disabling system devices, erasing or corrupting firmware, applications, or data files, transmitting potentially sensitive data to another location on the network, shutting down the computing device, and/or causing the computing device to crash. Yet another malicious and deleterious aspect of many computer malware attacks is that an infected computing device is used to infect other computers and/or systems.

In the world of cybersecurity, a "backdoor" refers to any method by which unauthorized users are able to circumvent normal security measures and gain high level user access on a computer system, network, or software application. For example, this type of hacking (referred to herein as "backdoor hacking") occurs when a computer user leaves his (or her) computer electronically connected to the Internet, but inactive for extended periods. During such inactive time intervals, the hacker clicks on the Internet-exposed name of the user's modem (or router), deciphers its password and proceeds with the malicious acts, e.g., copies crucial information (passwords, intellectual property, etc.) from and/or introduces unwanted application(s) into the user's computer which the hacker intends to access sometime in the future. Alternatively, the hacker can "freeze" the user's computer for what is called "ransomware" and hold the user hostage unless and until the user transmits the demanded ransomware fee to the hacker to unfreeze the user's computer. There are well-document public accounts of such ransomware attacks with substantial payments made to these cyber criminals.

Another type of hacking (referred to herein as "welcome-in hacking") occurs when a computer user encounters a technical problem and goes for help to a local computer repair shop or accesses an Internet repair/chat page. In either case, the repair technician claims that the problem is "serious", and that the technician can make the repair only if the computer user turns control over to the technician for a stated access time. The user complies, and the technical problem may or may not get resolved, but in that "welcome-in" access time the technician copies crucial information from and/or introduces unwanted malware into the user's computer. Yet another type of hacking (referred to herein as "also-included hacking") is implemented by the hacker presenting the user with an online Internet download (typically for no fee), such as a YouTube presentation, tutorial or game. In this case, the user downloads the application, but unknowingly, the user has also downloaded hacking malware. For example, so-called spear phishing refers to a specific type of targeted phishing attack. The attacker takes the time to research their intended targets and then write messages the target is likely to find personally relevant. These types of attacks are aptly called "spear" phishing because of the way the attacker focuses on specific target. The message will seem legitimate, which is why it can be difficult to spot a spear-phishing attack. Often, a spear-phishing attack uses email spoofing, where the information inside the "From" portion of the email is faked, making it look like the email is coming from a different sender. This can be someone the target trusts, like an individual within their social network, a friend, or a business partner. Attackers may also use website cloning to make the communication seem legitimate. With website cloning, the attacker copies a legitimate website to lull the victim into a sense of comfort. The target, thinking the website is real, then feels comfortable entering their private information.

A traditional defense against computer malware, and particularly computer viruses and worms, is antivirus software. Generally described, antivirus software scans the computer's incoming data, looking for identifiable patterns associated with known computer malware. Also, increasingly, antivirus software is utilizing heuristic techniques that compare incoming data with characteristics of known malware. In any event, upon detecting computer malware, the antivirus software may respond by removing the computer malware from the infected data, quarantining the malware, or deleting the infected incoming malware. Unfortunately, antivirus software typically works with known, identifiable computer malware. Frequently, this is done by matching patterns within the data to what is referred to as a "signature" of the malware. One of the core deficiencies in this malware detection model is that an unknown computer malware may propagate unchecked in a network until the antivirus software on the computing device is updated to identify and respond to the malware.

As antivirus software has become more sophisticated and efficient at recognizing thousands of known computer malware, so too have the hackers and computer malware become more sophisticated. For example, malicious computer users now encrypt malware to obscure the malware signature behind unrecognizable patterns. For example, some types of malware consist of a malware decryption routine and an encrypted malware "payload." When, a user executes an infected program, the malware decryption routine gains control of the computing device and decrypts the previously encrypted malware payload. Then the decryption routine transfers control of the computing device to the decrypted malware payload. Each time a new target is infected, the malware replicates both the decryption routine and the malware payload. Typically, the encryption key used to encrypt the malware payload is changed when the malware is replicated. As a result, the encrypted malware has no identifiable pattern or "signature" by which the malware may be recognized by antivirus software.

In yet another security alternative, the malware may be "quarantined." Typically, a quarantine occurs when data associated with the malware is altered to prevent execution of the malware. Quarantining malware is especially useful when a file may have been incorrectly identified as malware, the user wants to delay cleaning a file until a later time, or an infected file contains user data that needs to be saved. In some existing systems, a quarantined file is both prevented from executing program code and concealed from antivirus software that scans a computing device for malware. For example, one method of implementing a quarantine includes moving a file to a quarantine folder along with associated metadata that describes the location of the file. Among other things, the quarantine folder has established settings that prevent files from "executing" program code. To conceal the quarantined file from antivirus software, the data in the file is typically encoded. As a result, the file is not capable of causing harm to a computing device and will not be identified as malware if scanned by antivirus software.

Identification of a file or content item as "malware" by antivirus software, based upon a "signature" of the malware has various deficiencies. First, unknown computer malware may propagate undetected in a network until a computer's antivirus software is updated to identify and respond to the new computer malware. To help lessen the likelihood of this problem, a signature can be released as early as possible. However, protection technologies that are based on heuristics or signatures often suffer from false positives that run the risk of purging valid content. This problem is most noticed during the first few hours after new malware is released to the wild, while the level of information about the malware and potential side effects of its deletion is limited. To mitigate this problem protection technology vendors typically delay the release of a new signatures or heuristic patterns until the malware is fully understood and a comprehensive test pass is completed. and some opt to tune the heuristics and signatures to minimize false positives with the side effect of limiting the ability to detect malware. The impact of these mitigations is an increased window of exploit from the time malware is released in the wild until an asset is protected from that malware. Although various forms of hacking are well-known, the current attempts to counter them solely via protective antivirus software while effective do have at least the aforementioned limitations. Further, the protective software is susceptible to hacker counter-software which can mislead, incapacitate, block or circumvent the protective software security measures.

Accordingly, there is need for a hardware-centric solution that addresses hacking of computing devices which cannot be affected by contaminated software.

SUMMARY OF THE INVENTION

The present invention is directed to an anti-malware computer and configuration providing a hardware-centric solution for preventing hacking which cannot be affected by contaminated software.

In a first implementation of the invention, an anti-malware computer is provided comprising:
   a processor;
   a memory;
   a first Internet regulator device configured for triggering an Internet access request;
   a communications interface configured for activating a communications link between the anti-malware computer device and an Internet in response to the Internet access request triggered;
   an anti-malware circuit device that detects Internet activity across the communications link when activated and terminates the activated communications link upon expiration of an Internet inactivity time interval;
   a second Internet regulator device configured for triggering an immediate interrupt and termination of the communications link when activated at any time; and
   a visual indicator that indicates whether the communication link is currently activated or currently blocked.

In another aspect, the Internet inactivity time interval is a sample time of thirty (30) seconds.

In another aspect, the visual indicator is a light-emitting diode (LED).

In another aspect, the first Internet regulator device and the second Internet regulator device are each configured as a single-pole-single-throw (SPST) switch.

In another aspect, the anti-malware circuit device further comprises a memory, wherein the memory stores, responsive to the immediate interrupt triggered, information specific to the Internet activity exchanged across the communications link when activated immediately prior to a deployment of the second Internet regulator device.

In another aspect, the first Internet regulator device and the second Internet regulator device are deployed by a user of the anti-malware computer.

In another aspect, the communications link is a wireless communications link.

In another aspect, the communications interface establishes the communications link through a router external to the otherwise unprotected computer.

In another aspect, the Internet inactivity time interval is defined by a user of the anti-malware computer and the associated configuration.

In another aspect, the anti-malware circuit device further comprises: an inactivity counter coupled to the Internet regulator device and configured to measure the Internet inactivity time interval; a plurality of AND gates, wherein particular ones of the AND gates are configured to manage the inactivity counter and particular other ones of the AND gates are configured to manage allowing or blocking output signals from the anti-malware computer to the Internet across the communications link and allowing or blocking input signals from the Internet to the anti-malware computer across the communications link; and a visual indicator driver circuit configured for illuminating the visual indicator.

In another aspect, the particular ones of the AND gates comprise a first AND gate and a second AND gate and the particular other ones of the AND gates comprises a third AND gate and a fourth AND gate.

In another aspect, the anti-malware circuit device further comprises: a first inverter coupled to each of the first AND gate, the second AND gate, the third AND gate and the fourth AND gate; wherein an output of the first AND gate is coupled to an input of the first inverter and an output of the first inverter is coupled to an input of the second AND gate, an input of the third AND gate and an input of the fourth AND gate.

In another aspect, the anti-malware circuit device further comprises: a first semiconductor diode coupled between an output of the third AND gate and the input of the second AND gate; and a second semiconductor diode (e.g., a light-emitting diode (LED) is coupled to an output of the visual indicator driver circuit.

In another aspect, the first AND gate, the second AND gate, the third AND gate and the fourth AND gate are coupled with a normal activity line as an input, wherein the normal activity line toggles between a first volts of direct current (VDC) level and a second VDC level such that the communications link is activated, and Internet activity allowed only when the normal activity line is at the second VDC level.

In another aspect, the first VDC level equals zero (0) VDC and the second VDC level equals five (+5) VDC.

In another aspect, the anti-malware computer is a personal computer or a laptop computer.

In another aspect, a method is provided for preventing hacking of an anti-malware computer across an Internet connection. The method comprising: (i) receiving an Internet access request from an Internet regulator device, the Internet regulator device integrated with an anti-malware computer; (ii) responsive to the Internet access request received, establishing an Internet communications link between the computing device and the Internet and illuminating an Internet active indicator on the anti-malware computer; (iii) monitoring for active Internet activity cessation from the anti-malware computer; (iv) determining whether Internet activity is lacking and if so, initiating an Internet inactivity timer; (v) counting the total Internet inactivity time; and (vi) determining whether an Internet inactivity level has been met and if so, blocking the Internet communications link between the anti-malware computer and the Internet and deactivating the Internet ready indicator on the anti-malware computer.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
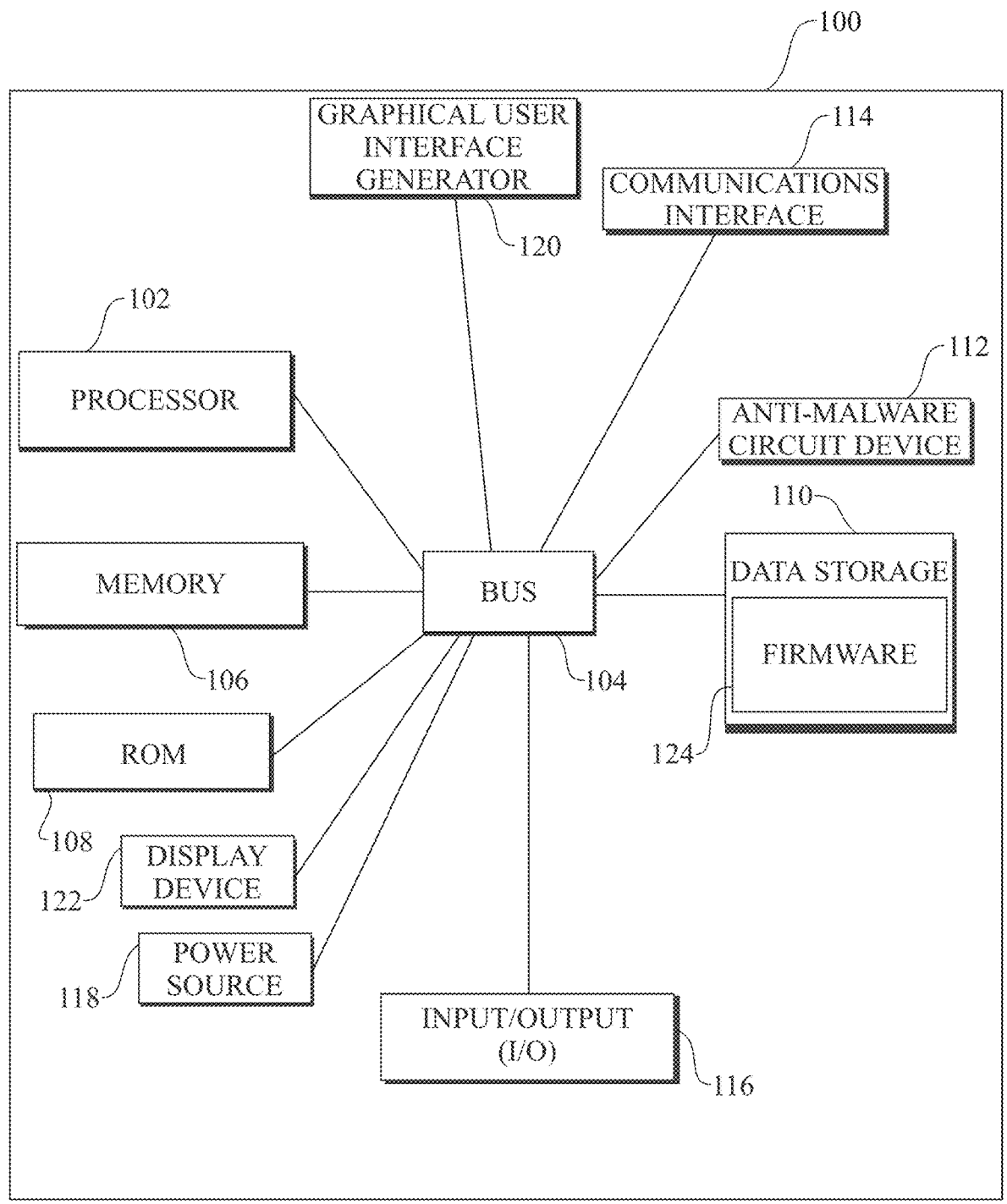
FIG. 1 presents a block diagram of an anti-malware computer and configuration in accordance with an illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an anti-malware computer and configuration providing a hardware-centric solution for preventing (or substantially reducing) hacking which cannot be affected by contaminated software. These attacks come in many different forms, including, but certainly not limited to, computer viruses, computer worms, system component replacements, denial of service attacks, even misuse/abuse of legitimate computer system features all of which exploit one or more computer system vulnerabilities for illegitimate purposes. As will be appreciated, these various computer attacks are technically distinct from one another, for purposes of the disclosure and for simplicity in description, all malicious computer programs will be generally referred to hereinafter as computer malware, or more simply, malware. Further, the anti-malware computer and configuration of the disclosed embodiments is particularly directed to preventing (or substantially reducing) so-called "backdoor hacking" whereby unauthorized users are able to circumvent normal security measures and gain high level user access on a computer system, network, or software application. For example, this type of hacking occurs when a computer user leaves his (or her) computer electronically connected to the Internet, but inactive for extended periods. During such inactive time intervals, the hacker clicks on the Internet-exposed name of the user's modem (or router), deciphers its password and proceeds with the malicious acts, e.g., copies crucial information (passwords, intellectual property, etc.) from and/or introduces unwanted application(s) into the user's personal computer which the hacker intends to access sometime in the future. In particular, the anti-malware computer and configuration of the disclosed embodiments will comprise and employ an anti-malware circuit device that will facilitate hacking prevention by receiving an Internet access request from an Internet regulator device, wherein the Internet regulator device is integrated with the anti-malware computer. Responsive to the Internet access request received, establishing an Internet communications link between the computing device and the Internet and illuminating an Internet active indicator (e.g., turning on an LED) on the anti-malware computer. Once Internet access is established there is a monitoring for active Internet activity cessation from the anti-malware computer and determining whether Internet activity is lacking and if so, initiating an Internet inactivity timer. The Internet inactivity timer is employed for counting the total Internet inactivity time such that a determination may be made as to whether an Internet inactivity time interval (e.g., thirty (30) seconds) has been met. If so, the Internet communications link between the anti-malware computer and the Internet is blocked and the "Internet Connected" indicator is deactivated (e.g., the LED is turned off). Thus, the anti-malware computer facilitates, among other things, Internet active (i.e., connected) intervals, Internet timer (i.e., timer engaged) intervals, and Internet inactive (i.e., disconnected) intervals in delivering a hacking prevention mechanism delivered by and through a hardware-centric solution. By creating brief timed intervals to verify Internet inactivity and disconnecting the anti-malware computer from the Internet (e.g., terminating any active Internet communications link) hacking may be prevented (or substantially reduced). During these defined (but brief) timer counting intervals the anti-malware computer may be vulnerable to hacking (similar to other devices) but by defining these intervals to be as brief as practical, this vulnerability may be effectively managed by reducing the hacking vulnerability window. Further, these "vulnerability windows" occur at unpredictable times given the principles of the disclosed embodiments. In this way, a user has control (e.g., manual control) over establishing Internet access and ensuring that such Internet access will be automatically blocked (even terminated in some cases) to prevent unauthorized access in the event of a specified level of Internet inactivity. Thus, the net effect is that the computer is connected to the Internet (almost exclusively) only when the user chooses to have an active engagement via the Internet.

Turning our attention initially to FIG. 1, a block diagram of an anti-malware computer 100 is shown configured in accordance with an illustrative embodiment of the present invention. More particularly, the anti-malware computer 100 comprises bus 104 and processor 102 coupled to the bus 104 for executing operations and processing information. As will be appreciated, a "computing device" in the context herein may comprise a wide variety of devices such as any type of hardware device that is capable of accessing the Internet and may be vulnerable to hacking such as personal computers, laptop computers, tablets, mobile devices, smartphones, and wearable devices, to name just a few. The processor 102, as powered by power source 118, may include both general and special purpose microprocessors, and may be the sole processor or one of multiple processors of the device. Further, the processor 102 may comprise one or more central processing units (CPUs) and may include, be supplemented by, or incorporated in, one or more application-specific integrated circuits (ASICs) and/or one or more field programmable gate arrays (FPGAs). The anti-malware computer 100 may also include memory 106 coupled to the bus 104 for storing computer-readable instructions to be executed by the processor 102. The memory 106 may also be utilized for storing temporary variables or other intermediate information during the execution of the instructions by the processor 102. The anti-malware computer 100 may also include read-only memory (ROM) 108 or other static storage device coupled to the bus 104. Further, data storage device 110, such as a magnetic, optical, or solid-state device may be coupled to the bus 104 for storing information and instructions for the processor 102. The data storage device 110 may store firmware 124 or other applications. Data storage device 110 and the memory 106 may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The anti-malware computer 100 may also include one or more communications interface 114 for establishing a communication link with the well-known Internet and for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 114 may be an ISDN card or modem/router (either internal or external to the anti-malware computer 100) used to facilitate data communications of various well-known types and formats. Further, illustratively, the communications interface 114 may be a local area network (LAN) card used to provide data communication connectivity to a comparable LAN. Wireless or wired communication links may also be implemented. As will be appreciated, the functionality of the communications interface is to send and receive a variety of signals (e.g., electrical, optical, or other signals) that transmit data streams representing various data types. The anti-malware computer 100 may also include one or more input/output devices 116 that enable user interaction with the anti-malware computer 100 such as a camera, display, keyboard, mouse, speakers, microphone, buttons, etc. The input/output devices 116 may include peripherals, such as a near-field communication (NFC) device (e.g., NFC reader), camera, printer, scanner (e.g., a quick response (QR)-code scanner or a radio-frequency identification (RFID) scanner), touchscreen display, etc. For example, the input/output devices 116 may include a display device such as a CRT, plasma monitor, LCD monitor or OLED monitor for displaying information to the user, a keyboard, and a pointing device such as a mouse or a trackball by which the user can provide input to the anti-malware computer 100 or an associated display device (e.g., display device 122) as managed by graphical user interface generator 120.

Figure 2:
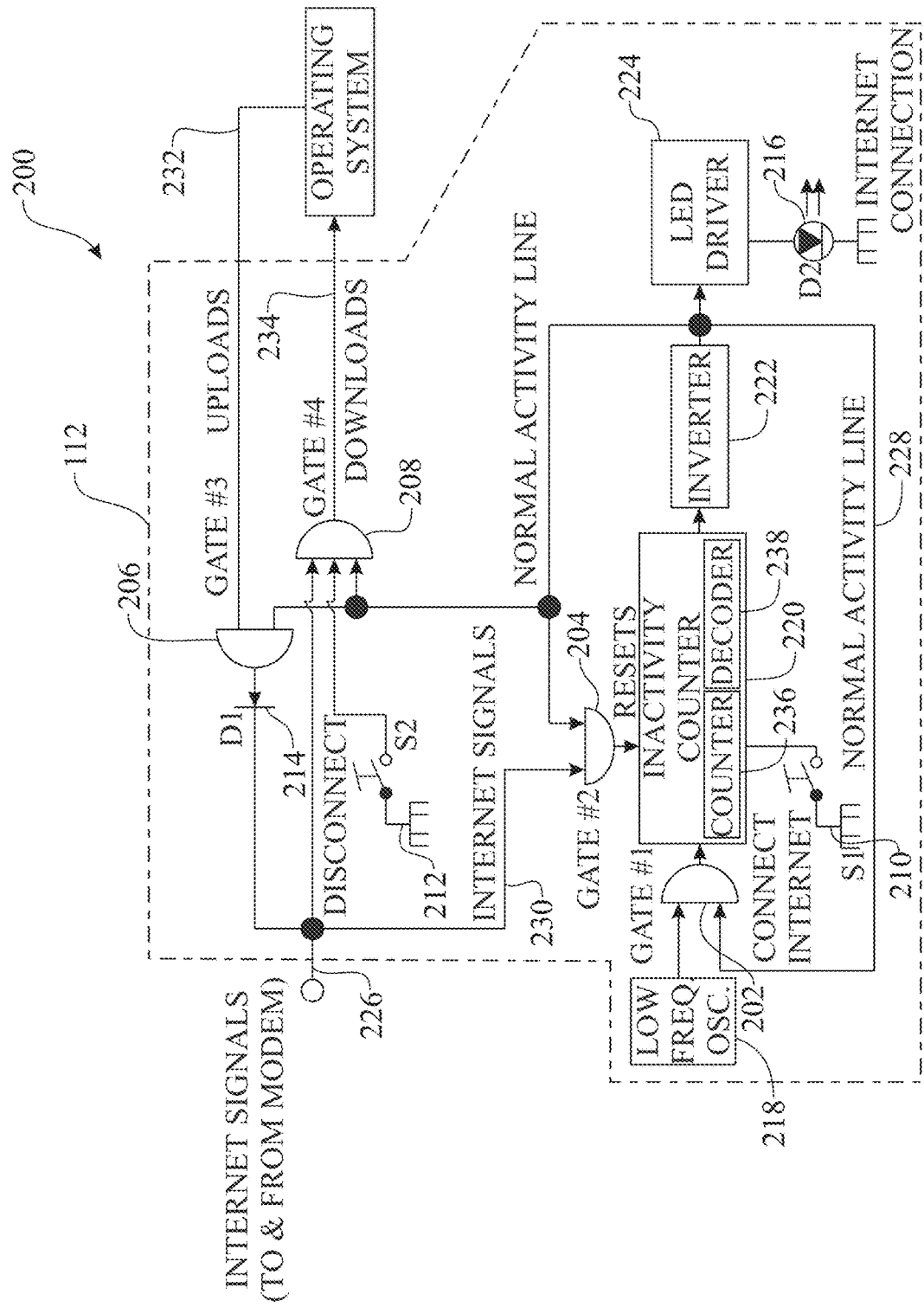
FIG. 2 presents a first configuration of the anti-malware circuit device as shown in FIG. 1 configured in accordance with an illustrative embodiment of the present invention.
Figure 3:
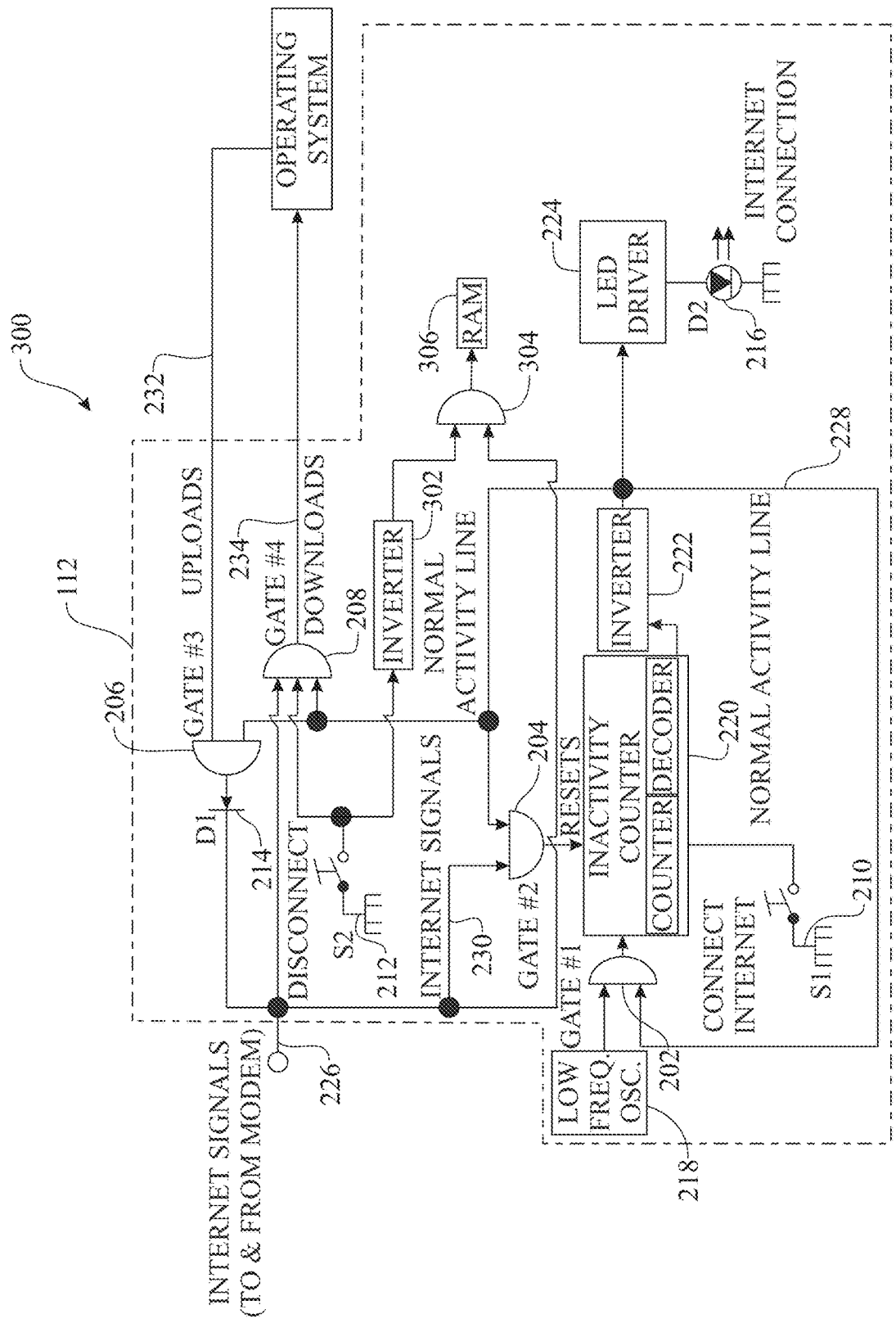
FIG. 3 presents a second configuration of the anti-malware circuit device as shown in FIG. 1 configured in accordance with an illustrative embodiment of the present invention.
Figure 4:
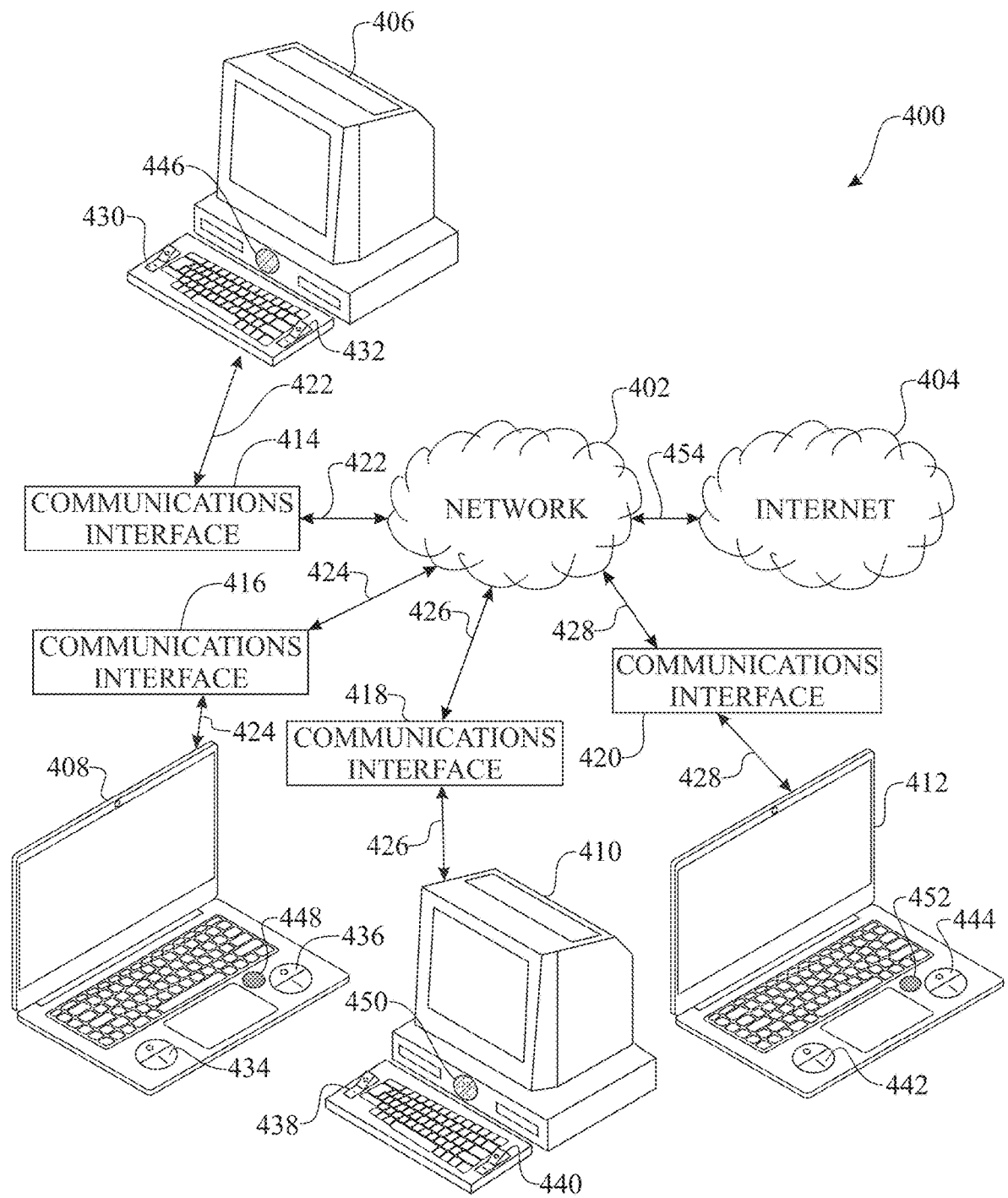
FIG. 4 presents an illustrative network architecture and use of anti-malware computers configured in accordance with an illustrative embodiment of the present invention.

The anti-malware computer 100 further comprises anti-malware circuit device 112 that is the specifically designed and configured hardware in accordance with principles of the disclosed embodiments for enabling the delivery of the above-detailed hacking prevention through a hardware-centric solution which cannot be affected by contaminated software. That is, the anti-malware circuit device 112 in accordance with the principles of the disclosed embodiments detects Internet activity across a communications link when activated and terminates the activated communications link upon expiration of an Internet inactivity time interval. To further illustrate these principles, we turn our attention to FIGS. 2, 3, and 4 that will be discussed together. FIG. 2 presents a first configuration 200 of the anti-malware circuit device 112 configured in accordance with an illustrative embodiment of the present invention, FIG. 3 presents a second configuration 300 of the anti-malware circuit device 112 configured in accordance with a further illustrative embodiment of the present invention, and FIG. 4 presents an illustrative network architecture 400 and use of anti-malware computer devices (i.e., anti-malware computer 406, 408, 410, and 412, respectively) in accordance with an illustrative embodiment of the present invention.

As shown in FIG. 2, the first configuration 200 of the anti-malware circuit device 112 configuration comprises a plurality of AND gates (i.e., a first AND gate 202, a second AND gate 204, a third AND gate 206, and a fourth AND gate 208). As will be readily understood, an AND gate is a basic digital logic gate that implements logical conjunction from mathematical logic such that the AND gate behaves according to a truth table. A high output results only if all the inputs to the AND gate are high. If all inputs to the AND gate are not high, low output results. For example, one analytical representation of an AND gate is as follows.

$$f(a, b) = a * b$$
$$f(0, 0) = 0 * 0 = 0$$
$$f(0, 1) = 0 * 1 = 0$$
$$f(1, 0) = 1 * 0 = 0$$
$$f(1, 1) = 1 * 1 = 1$$

With respect to the disclosed embodiments, a "logical low"=0 VDC and a "logical high"=+5 VDC. Using such logical lows and highs, a normal activity line 228 that couples the plurality of AND gates toggles between a first VDC level (i.e., the logical low at 0 VDC) and a second VDC level (i.e., the logical high level at +5 VDC) such that a communications link (see, for example, communications link 422 as shown in FIG. 4) is activated, and Internet activity allowed only when the normal activity line 228 is at the second VDC level (i.e., the logical high level at +5 VDC). As such, the normal activity line 228 is used for controlling the opening and closing of the first AND gate 202, the second AND gate 204, the third AND gate 206, and the fourth AND gate 208 whereby "normal" interaction (that is an active connection) between the anti-malware computer 100 and Internet 404 (see, FIG. 4) occurs when the normal activity line 228 is at the second VDC level (i.e., the logical high level at +5 VDC) and all the AND gates are open. Alternatively, any active connection between the anti-malware computer 100 and the Internet 404 is disconnected when the normal activity line 228 is at the first VDC level (i.e., the logical low at 0 VDC) and all the AND gates are closed.

Thus, in accordance with the principles of the disclosed embodiments, the first AND gate 202 passes or blocks low frequency signals (e.g., from low frequency oscillator 218) to an inactivity counter 220, the second AND gate 204 passes or blocks reset pulses to the inactivity counter 220, the third AND gate 206 passes or blocks output signals (e.g., uploads 232) from the anti-malware computer 100, and the fourth AND gate 208 passes or blocks Internet signals 230 from the Internet received at input 226 (including, but not limited to any downloads 234). The inactivity counter 220 may be configured using counter 236 and decoder 238 interconnected sequentially, for example, for measuring an Internet inactivity time interval (e.g., thirty (30) seconds or less) which will be used for blocking active Internet connections and hacking prevention, as detailed herein. Illustratively, the Internet inactivity time interval may be a system setting or defined by the user. Further, a visual indicator (e.g., visual indicator 446, visual indicator 448, visual indicator 450, and visual indicator 452 as shown in FIG. 4) is illuminated whenever the anti-malware computer 100 and the Internet 404 are currently connected and active. In an aspect, the visual indicator may be an LED that is driven and illuminated by visual indicator driver circuit 224 (e.g., an LED driver) and the light-emitting diode (i.e., the semiconductor diode 216). This allows a user of the anti-malware computer 100 to always have a visual indication that is readily ascertainable indicating periods where the anti-malware computer 100 and the Internet 404 are currently connected and active. A first semiconductor diode 214 is coupled between an output of the third AND gate 206 and the input of the second AND gate 204 for circuit protection of the third AND 206 from Internet download signals, and a second semiconductor diode 216 (i.e., a light-emitting diode (LED)) is coupled to an output of the visual indicator driver circuit 224.

As shown in FIG. 4, each anti-malware computer is configured (in accordance with FIG. 1) with the anti-malware circuit device 112 (configured in accordance with either of the configurations shown in FIGS. 2 and 3, respectively), a first Internet regulator device, a second Internet regulator device, and a visual indicator. The first Internet regulator device is configured for triggering an Internet access request, the second Internet regulator device is configured for triggering an immediate interrupt and termination of the communications link when activated at any time, and the visual indicator indicates whether the communication link is currently activated or currently blocked (even terminated in some cases). More particularly, anti-malware computer 406 further comprises Internet regulator devices 430 and 432 and visual indicator 446, anti-malware computer 408 further comprises Internet regulator devices 434 and 436 and visual indicator 448, anti-malware computer 410 further comprises Internet regulator devices 438 and 440 and visual indicator 450, and anti-malware computer 412 further comprises Internet regulator devices 442 and 444 and visual indicator 452. In an embodiment, the first Internet regulator device and the second Internet regulator device are each configured as a SPST switch, and the visual indicator is configured as an LED. Of course, these are only one of many possible configurations for the Internet regulator device and the visual indicator that may be used in accordance with the principles of the disclosed embodiments. For example, the Internet regulator device may be a toggle switch, a keyboard button, or a "soft" switch configured on a touchscreen, to name just a few. Each of the anti-malware computers 406, 408, 410, and 412 may also be communicatively coupled with a respective communications interface (i.e., communications interface 414, communications interface 416, communications interface 418, and communications interface 420) to facilitate the establishment of a respective communications link (i.e., communications link 422, communications link, 424, communications link 426, and communications link 428). For example, the communications interface 414 may be a router, modem or LAN.

In this way, each of the anti-malware computer may establish a connection with the Internet 404 through network 402. As will be appreciated, the network 402 may be any type of wired or wireless network enabling such communications links with the Internet 404. For example, the network 404 may comprise a cloud network services architecture that includes a cloud network comprising at least server(s), access point(s) and database(s). Cloud, cloud service, cloud server and cloud database are broad terms and are to be given their ordinary and customary meaning to one of ordinary skill in the art and includes, without limitation, any database, data repository or storage media which store data and other information A cloud server may include an HTTP/HTTPS server sending and receiving messages to provide web-browsing interfaces to client web browsers as well as web services to send data to integrate with other interfaces (e.g., as executed on the anti-malware computers). The cloud server may be implemented in one or more servers and may send and receive data in a various forms and formats, user supplied and/or created information/data and profile/configuration data that may be transferred from or stored in a cloud database. A cloud database may include one or more physical servers, databases or storage devices as dictated by the cloud service's storage requirements. The cloud database may further include one or more well-known databases (e.g., an SQL database) or a fixed data storage system to store content, data, user profile information, configuration information, administration information and any other information necessary to execute the cloud service. In various embodiments, one or more networks supplying computing infrastructure on behalf of one or more users may be referred to as a cloud, and resources may include, without limitation, data center resources, applications (e.g., software-as-a-service or platform-as-a-service) and management tools. The communications links 422, 424, 426, 428, and 454 may be established in accordance with any number of well-known communications protocols and methods (e.g., wireless communications).

For ease of discussion and clarity, we will now discuss the operation of the anti-malware computer 406 but it will be understood that the principles of the disclosed embodiments discussed apply equally to the anti-malware computer 408, 410, and 412. More particularly, when the anti-malware computer 406 is initially powered up and turned on the count on counter 236=0, the decoder 238 output=0 (as noted above, the counter 236 and decoder 238 are part of the inactivity counter 220), the inverter 222 output=+5 VDC, and the normal activity line=+5 VDC. Illustratively, the counter 236 is a 60 Hz counter. Thus, at the initial powering up of the anti-malware computer 406 the output of the counter 236 is 0 VDC such that the inverter's 222 output is +5 VDC. As such, the plurality of AND gates (i.e., the first AND gate 202, the second AND gate 204, the third AND gate 206, and the fourth AND gate 208) are all "open" thereby allowing and passing digital signals unaltered. However, during this initial powering up routine (also referred to herein as a waking routine), there will be a plurality of Internet signal pulses that will be rapidly resetting the counter 236 such that a pre-defined Internet inactivity time interval (e.g., two (2) minutes) will not be reached and the decoder 238 will not respond and its output will remain locked at 0 VDC such that the inverter's 222 output will maintain the normal activity line 228 at +5 VDC throughout the initial start-up of the anti-malware computer 406. Further, the visual indicator 446 will remain illuminated throughout this initial start-up cycle as activated by the visual indicator circuit 224 (e.g., an LED driver) and the light-emitting diode (i.e., the semiconductor diode 216).

However, once the initial start-up routine is completed, the aforementioned Internet pulses will cease and the counting of Internet activity against the Internet inactivity time interval will start in the normal course. If the Internet inactivity time interval is reached, the decoder's 238 output falls rises to +5 VDC and the inverter 222 then causes the normal activity line to fall to 0 VDC which closes the first AND gate 202, the second AND gate 204, the third AND gate 206, and the fourth AND gate 208. Upon such AND gate closures, all Internet activity is blocked (via AND gate 206 and AND gate 208), the visual indicator 446 is turned off and the AND gate 202 stops the counter 236 from counting and the AND gate 204 prevents the counter 236 from being reset by any external output (i.e., input to the anti-malware computer 406) such as a received Internet signal/pulse from a potential or actual hacker.

At this point, to access the Internet 404, the user of the anti-malware computer 406 the user will deploy the Internet regulator device 430 (i.e., a first Internet regulator device as also shown electrically in FIG. 2 as first switch (S1) 210). Such deployment may come in various forms depending upon the configuration of the Internet regulator device 430. For example, the user may toggle a physical switch, tap a keyboard switch or tap a "soft" switch presented on the display device 122 of the anti-malware computer 406. Deployment of the Internet regulator device 430 causes the internal logic of the anti-malware circuit device 112 to register as follows: the counter 236 is reset such that count falls=0, the decoder 238 output=0 VDC, the inverter 222 output=+5 VDC and the normal activity line 228=+5 VDC. As such, each of the first AND gate 202, the second AND gate 204, the third AND gate 206, and the fourth AND gate 208 are "opened" and communication between the anti-malware computer 406 and the Internet is established (or re-established, as the case may be) thereby allowing for normal Internet activity to be executed from the anti-malware computer 406. The visual indicator 446 will also be illuminated thereby indicating to the user that the connection to the Internet 404 is active and remain that way during sustained active Internet activity. As an additional security measure, in an embodiment, the user will have a set time period (e.g., thirty (30) seconds) after deploying the Internet regulator device 430 to begin such Internet activity in order to maintain the activity connection. However, if the user fails to initiate Internet activity within such set time period, then the anti-malware circuit device 112 will terminate the active Internet connection and the anti-malware computer 406 will again be disconnected from the Internet 404 and the visual indicator 446 will be turned off. As such, in the normal course of operation when the user observes the visual indicator 446 is off, they will understand that Internet activity is currently being prevented and the user must again deploy Internet regulator device 430 to initiate the Internet connection procedures and to illuminate the visual indicator 446. Other mechanisms may also be used as an alternative to the set time period. For example, a particular key on the keyboard of the anti-malware computer 406 may be designated such that user must depress this key and if not depressed then the Internet connection will be disconnected as detailed above.

Thus, in accordance with the principles of the disclosed embodiments, as the user goes about their normal activities there will most likely be several extended inactive intervals where no Internet activity is desired. For each inactivity interval occurrence, the anti-malware circuit device 112 will trigger the disconnection/blocking of any active Internet connection between the anti-malware computer 406 and the Internet 404 thereby preventing the hacking of the anti-malware computer 406 from deleterious and criminal hacking activities in accordance with the principles of the disclosed embodiments. Importantly, because the anti-malware circuit device 112 is capable of disconnecting the anti-malware computer 406 from the Internet 404 (after expiration of the Internet inactivity time interval) the principles of the disclosed embodiments provide a significant protection measure against not only hackers (in particular back-door hacking) but also potentially against viruses, cookies, ransomware, and the like. Further, given the hardware-centric principles of the disclosed embodiments the well-known problems with respect to software-centric hacking approaches are eliminated (or substantially reduced).

In accordance with the principles of the disclosed embodiments, the anti-malware computer 406 is further configured with the Internet regulator device 432 (i.e., a second Internet regulator device, also shown electrically in FIG. 2 as second switch (S2) 212). This second Internet regulator device provides for triggering an immediate interrupt and termination of the active/established communications link (e.g., the communications link 422) between the anti-malware computer 406 and the Internet 404 when activated at any time. The defines a further security measure in the event a hacker somehow defeats the primary security features as detailed above. For example, if the hacker devises a way to artificially change or maintain the normal activity line 228 in a high state (i.e., +5 VDC) thereby allowing for the continuance the active communications link 422 between the anti-malware computer 406 and the Internet 404. In such a scenario, the user will have an immediate indication of the Internet connection given the visual indicator 446 will be illuminated unexpectedly and they may therefore be susceptible to hacking. However, the user may deploy (i.e., close) the second Internet regulator device (e.g., the Internet regulator device 432) at any time which will initiate the closure of the AND gate 208 (at 0 VDC) thereby blocking the active Internet connection and interrupting any potential hacking. This condition may be maintained by the user for as long as they need to clear the threat including, but not limited to, resetting any passwords that may have been comprised.

Turning our attention to FIG. 3, a second configuration 300 of the anti-malware circuit device 112 is shown configured in accordance with a further illustrative embodiment of the present invention. More particularly, the second configuration 300 comprises the details of first configuration 200 from FIG. 2 but further comprises inverter 302 coupled to the second switch 212, AND gate 304, and memory 306 (e.g., random access memory (RAM)). As detailed above, in order for electronic hacking to take place on the anti-malware computer herein (e.g., the anti-malware computer 406) the respective normal activity line 228 must be in a high state (i.e., +5 VDC) in which case the user will have the visual indication from the visual indicator (e.g., the visual indicator 446) being illuminated that there is an unexpected active Internet connection. As detailed above, the user may deploy (i.e., close) the second Internet regulator device (e.g., the Internet regulator device 432) at any time which will initiate the closure of the AND gate 208 (at 0 VDC) thereby blocking the active Internet connection and interrupting any potential hacking. In the subject embodiment, upon deployment of the second Internet regulator in addition to the immediate closure of AND gate 208 this will trigger an opening of the AND gate 304 from the output of the inverter 302 (at +5 VDC). In turn, responsive to the immediate interrupt triggered, the memory 306 is used to store information specific to the Internet activity exchanged across the active communications link (e.g., the communications link 422) immediately prior to a deployment of the second Internet regulator device (e.g., the Internet regulator device 432) and the termination thereof. Illustratively, the information stored by the memory 306 may be used for forensic investigation of the hacking including, but not limited to, identifying the time and date of the hacking attack and the Internet signals received therefrom. This may lead to the identification of the hacker (e.g., an Internet Protocol Address or other identifying information) and subsequent actions.

Figure 5:
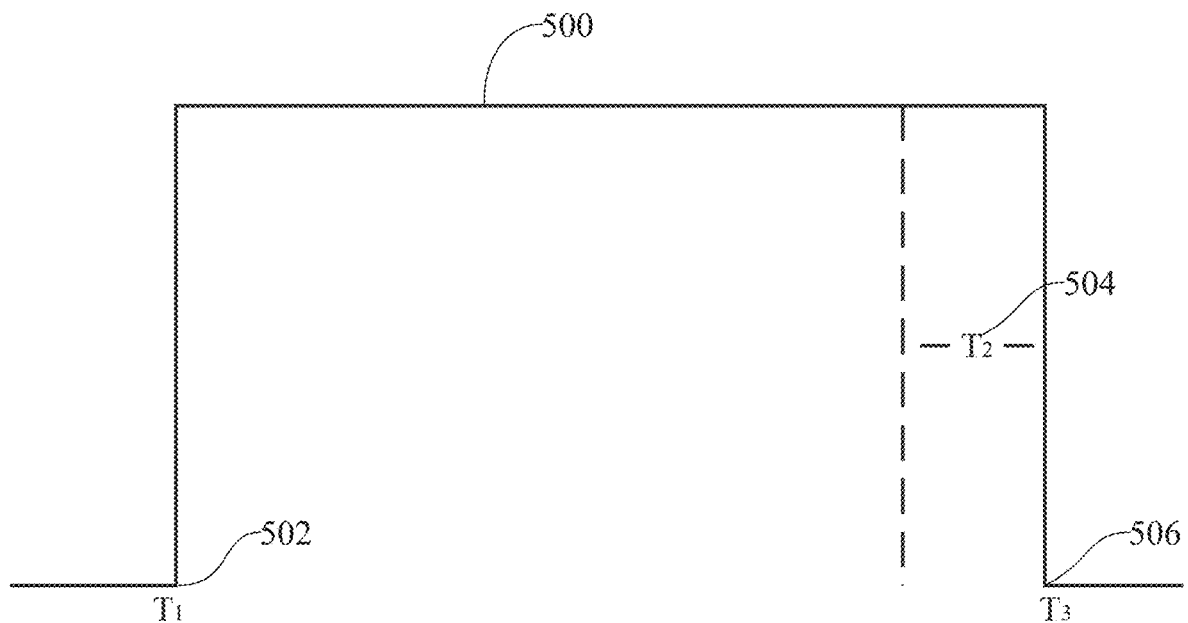
FIG. 5 presents an illustrative timing diagram demonstrating Internet activity and inactivity managed by an anti-malware computer in accordance with an illustrative embodiment of the present invention.

Turning our attention to FIG. 5, an illustrative timing diagram 500 is shown demonstrating Internet activity and inactivity managed by an anti-malware computer device in accordance with an illustrative embodiment of the present invention. As detailed above, the user will initiate (at time ($T_1$) 502) the Internet use and connection by deploying the respective Internet regulator device. At some point in time, the last Internet activity and instruction(s) will be completed and the respective inactivity timer 220 will be initiated and if inactivity continues such the Internet inactivity time interval has been reached (time ($T_2$) 504) the active Internet connection is blocked (at time ($T_3$) 506). As will be appreciated, the smaller the value of the Internet inactivity time interval will enhance the hacking prevention measures of the anti-malware computer as configured with the anti-malware circuit device 112. Defining this Internet inactivity time therefore will be a balance between such hacking prevention measures and the user's ability to effectively use the anti-malware computer in an efficient manner without undue frustration from the security measures deployed.

Figure 6:
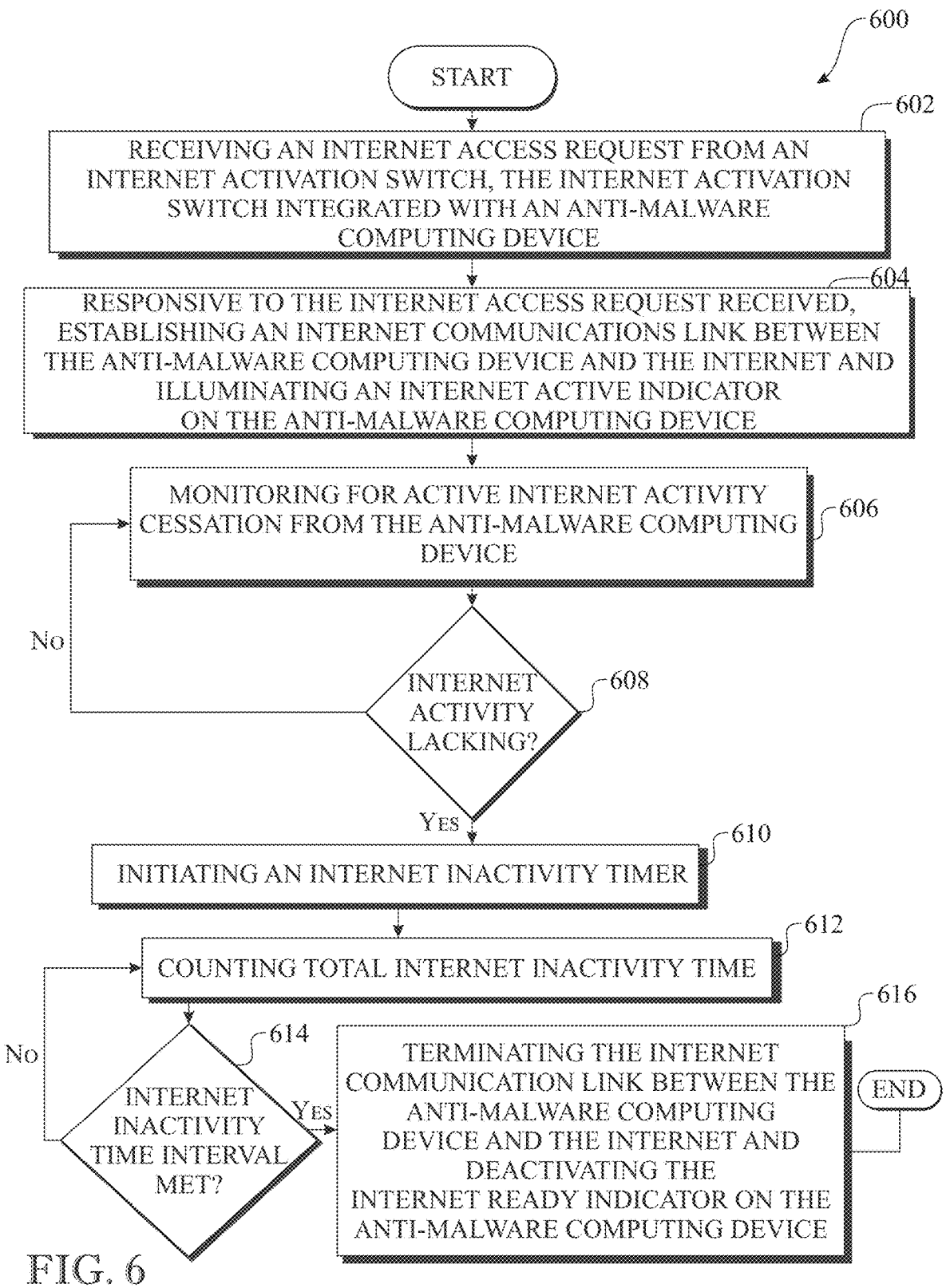
FIG. 6 presents a flowchart of illustrative operations for preventing hacking across an Internet connection in accordance with an illustrative embodiment of the present invention.

Turning our attention to FIG. 6, a flowchart of illustrative operations 600 is shown for preventing hacking across an Internet connection in accordance with an illustrative embodiment of the present invention. More particularly, at step 602, receiving an Internet access request from an Internet regulator device, wherein the Internet regulator device is integrated with an anti-malware computer. Responsive to the Internet access request received, at step 604, establishing an Internet communications link between the anti-malware computer and the Internet and illuminating an Internet active indicator on the anti-malware computer. At step 606, monitoring for active Internet activity cessation from the anti-malware computer and at step 608, determining whether Internet activity is lacking. If not, continue monitoring at step 606. If so, at step 610, initiating an Internet inactivity timer and counting, at step 612, the total Internet inactivity time. Then, at step 614, determining whether an Internet inactivity level has been met. If not, continue counting at step 612. If so, at step 616, blocking (and in some cases terminating) the Internet communications link between the anti-malware computer and the Internet and deactivating the Internet ready indicator on the anti-malware computer. Illustratively, the aforementioned operations are initiated and repeated in accordance with deploying the Internet regulator device of the anti-malware computer as detailed herein above.

The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. Accordingly, the applications and programs, for example, may be written using any number of programming languages and/or executed on compatible platforms including, but not limited to, JavaScript, PHP (PHP: Hypertext Preprocessor), WordPress, Drupal, Laravel, React.js, Angular.js, and Vue.js. Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions (e.g., non-transitory computer readable mediums) may execute entirely on one or more standalone computers, partly on one or more standalone computers, as a standalone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including LANs, wide area networks (WANs), through the Internet (e.g., using an Internet Service Provider), or the connection may be made to external computers.

As noted above, in some embodiments the method(s) described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method(s) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:
1. An anti-malware computer comprising:
   a processor;
   a memory;
   a first Internet regulator device configured for triggering an Internet access request;

a communications interface configured for activating a communications link between the anti-malware computer device and an Internet in response to the Internet access request triggered;

an anti-malware circuit device that detects Internet activity across the communications link when activated and blocks the activated communications link upon expiration of an Internet inactivity time interval;

a second Internet regulator device configured for triggering an immediate interrupt and blocking of the communications link when activated at any time, wherein the first Internet regulator device and the second Internet regulator device are each configured as a single pole single throw (SPST) switch; and a visual indicator that indicates whether the communication link is currently activated or currently blocked.

2. The anti-malware computer of claim 1, wherein the Internet inactivity time interval is a sample time of thirty (30) seconds.

3. The anti-malware computer of claim 1, wherein the visual indicator is a light emitting diode (LED).

4. The anti-malware computer of claim 1, wherein the anti-malware circuit device further comprises a memory, wherein the memory stores, responsive to the immediate interrupt triggered, information specific to the Internet activity exchanged across the communications link when activated immediately prior to a deployment of the second Internet regulator device.

5. The anti-malware computer of claim 1, wherein the first Internet regulator device and the second Internet regulator device are operated by a user of the anti-malware computer.

6. The anti-malware computer of claim 1, wherein the communications link is a wireless communications link.

7. The anti-malware computer of claim 1, wherein the communications interface establishes the communications link through a router external to the anti-malware computer.

8. The anti-malware computer of claim 1, wherein the Internet inactivity time interval is defined by a user of the anti-malware computer.

9. The anti-malware computer of claim 1, wherein the anti-malware circuit device further comprises:

an inactivity counter coupled to the first Internet regulator device and configured to measure the Internet inactivity time interval;

a plurality of AND gates, wherein particular ones of the AND gates are configured to manage the inactivity counter and particular other ones of the AND gates are configured to manage allowing or blocking output signals from the anti-malware computer to the Internet across the communications link and allowing or blocking input signals from the Internet to the anti-malware computer across the communications link; and a visual indicator driver circuit configured for illuminating the visual indicator.

10. The anti-malware computer of claim 9, wherein the particular ones of the AND gates comprise a first AND gate and a second AND gate and the particular other ones of the AND gates comprises a third AND gate and a fourth AND gate.

11. The anti-malware computer of claim 10, wherein the anti-malware circuit device further comprises:

a first inverter coupled to each of the first AND gate, the second AND gate, the third AND gate and the fourth AND gate; wherein an output of the first AND gate is coupled to an input of the first inverter and an output of the first inverter is coupled to an input of the second AND gate, an input of the third AND gate and an input of the fourth AND gate.

12. The anti-malware computer of claim 11, wherein the anti-malware circuit device further comprises:

a first semiconductor diode coupled between an output of the third AND gate and the input of the second AND gate; and a second semiconductor diode is coupled to an output of the visual indicator driver circuit, wherein the second semiconductor diode is a light-emitting diode (LED).

13. The anti-malware computer of claim 10, wherein the first AND gate, the second AND gate, the third AND gate and the fourth AND gate are coupled with a normal activity line as an input, wherein the normal activity line toggles between a first volts of direct current (VDC) level and a second VDC level such that the communications link is activated, and Internet activity allowed only when the normal activity line is at the second VDC level.

14. The anti-malware computer of claim 13, wherein the first VDC level equals zero (0) VDC and the second VD level equals five (+5) VDC.

15. The anti-malware computer of claim 1, wherein the anti-malware computer is a personal computer or a laptop computer.

16. An anti-malware computer comprising:

a processor;

a memory;

a first Internet regulator device configured for triggering an Internet access request;

a communications interface configured for activating a communications link between the anti-malware computer device and an Internet in response to the Internet access request triggered;

an anti-malware circuit device that detects Internet activity across the communications link when activated and blocks the activated communications link upon expiration of an Internet inactivity time interval;

a second Internet regulator device configured for triggering an immediate interrupt and blocking of the communications link when activated at any time, wherein the first Internet regulator device and the second Internet regulator device are each configured as a single-pole-single-throw (SPST) switch which are operated by a user of the anti-malware computer; and a visual indicator that indicates whether the communication link is currently activated or currently blocked.

17. The anti-malware computer of claim 16, wherein the anti-malware circuit device further comprises:

an inactivity counter coupled to the first Internet regulator device and configured to measure the Internet inactivity time interval;

a plurality of AND gates, wherein particular ones of the AND gates are configured to manage the inactivity counter and particular other ones of the AND gates are configured to manage allowing or blocking output signals from the anti-malware computer to the Internet across the communications link and allowing or blocking input signals from the Internet to the anti-malware computer across the communications link; and a visual indicator driver circuit configured for illuminating the visual indicator.

18. The anti-malware computer of claim 16, wherein the anti-malware circuit device further comprises a memory, wherein the memory stores, responsive to the immediate interrupt triggered, information specific to the Internet activity exchanged across the communications link when activated immediately prior to a deployment of the second Internet regulator device.

19. An anti-malware computer comprising:
- a processor;
- a memory;
- a first Internet regulator device configured for triggering an Internet access request;
- a communications interface configured for activating a communications link between the anti-malware computer device and an Internet in response to the Internet access request triggered;
- a second Internet regulator device configured for triggering an immediate interrupt and blocking of the communications link when activated at any time, wherein the first Internet regulator device and the second Internet regulator device are each configured as a single-pole-single-throw (SPST) switch which are operated by a user of the anti-malware computer;
- a visual indicator that indicates whether the communication link is currently activated or currently blocked; and
- an anti-malware circuit device that detects Internet activity across the communications link when activated and blocks the activated communications link upon expiration of an Internet inactivity time interval, wherein the anti-malware circuit device further comprises:
  - a memory such that the memory stores, responsive to the immediate interrupt triggered, information specific to the Internet activity exchanged across the communications link when activated immediately prior to a deployment of the second Internet regulator device;
  - an inactivity counter coupled to the Internet regulator device and configured to measure the Internet inactivity time interval;
  - a plurality of AND gates, wherein particular ones of the AND gates are configured to manage the inactivity counter and particular other ones of the AND gates are configured to manage allowing or blocking output signals from the anti-malware computer to the Internet across the communications link and allowing or blocking input signals from the Internet to the anti-malware computer across the communications link; and
  - a visual indicator driver circuit configured for illuminating the visual indicator.

\* \* \* \* \*